US007274988B2

(12) United States Patent
Mukaiyama (10) Patent No.: US 7,274,988 B2
(45) Date of Patent: Sep. 25, 2007

(54) VEHICULAR DRIVING SUPPORT APPARATUS AND DRIVING SUPPORT METHOD

(75) Inventor: Yoshio Mukaiyama, Mishima (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 661 days.

(21) Appl. No.: 10/784,156

(22) Filed: Feb. 24, 2004

(65) Prior Publication Data
US 2004/0181339 A1  Sep. 16, 2004

(30) Foreign Application Priority Data
Mar. 14, 2003  (JP)  ............... 2003-070848

(51) Int. Cl.
*G08G 1/16* (2006.01)
(52) U.S. Cl. ............. 701/301; 701/96; 340/436; 340/903
(58) Field of Classification Search ............ 701/301, 701/96; 340/436, 903
See application file for complete search history.

(56) References Cited

U.S. PATENT DOCUMENTS

| 5,295,551 | A | * | 3/1994 | Sukonick | 180/167 |
| 5,761,630 | A | * | 6/1998 | Sekine et al. | 701/301 |
| 5,926,117 | A | * | 7/1999 | Gunji et al. | 340/988 |
| 5,939,976 | A | * | 8/1999 | Sasaki et al. | 340/435 |
| 6,044,321 | A | * | 3/2000 | Nakamura et al. | 701/96 |
| 6,061,613 | A | * | 5/2000 | Zyburt et al. | 701/24 |
| 6,115,652 | A | * | 9/2000 | Sato et al. | 701/28 |
| 6,151,539 | A | * | 11/2000 | Bergholz et al. | 701/25 |
| 6,167,331 | A | * | 12/2000 | Matsumoto et al. | 701/23 |
| 6,233,516 | B1 | * | 5/2001 | Egawa | 701/96 |
| 6,292,109 | B1 | * | 9/2001 | Murano et al. | 340/903 |
| 6,307,484 | B1 | * | 10/2001 | Sasaki et al. | 340/903 |
| 6,313,758 | B1 | * | 11/2001 | Kobayashi | 340/932 |
| 6,445,308 | B1 | | 9/2002 | Koike | |
| 6,469,653 | B1 | * | 10/2002 | Haynes | 342/20 |
| 6,560,525 | B1 | * | 5/2003 | Joyce et al. | 701/96 |
| 6,615,137 | B2 | * | 9/2003 | Lutter et al. | 701/301 |
| 6,624,782 | B2 | * | 9/2003 | Jocoy et al. | 342/70 |
| 6,708,099 | B2 | * | 3/2004 | Tellis et al. | 701/96 |
| 7,069,146 | B2 | * | 6/2006 | Yamamura et al. | 701/301 |

(Continued)

FOREIGN PATENT DOCUMENTS

EP  1 127 727 A2  8/2001

(Continued)

OTHER PUBLICATIONS

Qing Xu et al., "*Effects of Vehicle-vehicle/roadside-vehicle Communicaiton on Adaptive Cruise Controlled Highway Systems*", IEEE Vehicular Technology Conference, NY, NY, vol. 1 ol. 1, Sep. 24, 2002, pp. 1249-1253.

(Continued)

*Primary Examiner*—Thomas Black
*Assistant Examiner*—Wae Lenny Louie
(74) *Attorney, Agent, or Firm*—Kenyon & Kenyon LLP (57) ABSTRACT

A vehicular driving support apparatus capable of causing a host vehicle to perform a following run with respect to a specific vehicle selected as a followed vehicle determines the possibility of intersection between the host vehicle and another vehicle, and stops the following run if the possibility of intersection becomes greater than or equal to a predetermined value.

17 Claims, 6 Drawing Sheets

U.S. PATENT DOCUMENTS

| | | | |
|---|---|---|---|
| 7,133,768 B2* | 11/2006 | Mukaiyama | 701/200 |
| 2003/0078718 A1 | 4/2003 | Takenaga et al. | |
| 2004/0181339 A1* | 9/2004 | Mukaiyama | 701/301 |
| 2005/0128063 A1* | 6/2005 | Isaji et al. | 340/439 |
| 2007/0030132 A1* | 2/2007 | Kobayashi et al. | 340/436 |

FOREIGN PATENT DOCUMENTS

| | | |
|---|---|---|
| JP | 08263793 A | 10/1996 |
| JP | A 11-13507 | 1/1999 |
| JP | A 11-20499 | 1/1999 |
| JP | 11110700 A | 4/1999 |
| JP | 2000-207691 | 7/2000 |
| JP | 2001-30798 | 2/2001 |
| JP | 2001-236600 | 8/2001 |
| JP | 2002-120594 | 4/2002 |
| JP | 2002-304700 A | 10/2002 |

OTHER PUBLICATIONS

Anouck Girard et al., "*A control Architecture for Integrated Cooperative Cruise Control and Collision Warning Systems*", IEEE Conference on Decision and Control, NY, NY,, vol. 1, Dec. 4, 2001, pp. 1491-1496.

Takeshi Sakaguchi, et al. , "*Cooperative Driving of Automated Vehicles with Inter-vehicle Communications*", Proceedings of the IEEE Dearborn, Mi, Piscataway, NJ, Oct. 3, 2000, pp. 516-521.

Japanese Language Version of Japanese Official Action, Appln. No. 2003-070848 issued Aug. 15, 2006.

English Language Translation of Japanese Official Action, Appln. No. 2003-070848 issued Aug. 15, 2006.

* cited by examiner

VEHICULAR DRIVING SUPPORT APPARATUS AND DRIVING SUPPORT METHOD

The disclosure of Japanese Patent Application No. 2003-070848 filed on Mar. 14, 2003 including the specification, drawings and abstract is incorporated herein by reference in its entirety.

BACKGROUND OF THE INVENTION

1. Field of the Invention

The invention relates to a vehicular driving support apparatus and driving support method capable of causing a host vehicle to follow a specific vehicle (hereinafter also referred to as a "following run"). More particularly, the invention relates to a vehicular driving support apparatus and driving support method capable of stopping the following run of the host vehicle if the possibility of intersection with another vehicle reaches or exceeds a predetermined value.

2. Description of the Related Art

Japanese Patent Application Laid-Open Publication No. 11-13507 and No. 11-20499, as for example, describe an apparatus or system in which, in order to cause a host vehicle to follow a preceding vehicle (followed vehicle), a following run control is performed through the use of information acquired via the vehicle-to-vehicle communication between the host vehicle and the preceding vehicle instead of or in addition to the information regarding the following distance from the host vehicle to the preceding vehicle detected by a radar or the like.

In the field of vehicle-to-vehicle communication, an apparatus or system is known which acquires vehicular information regarding position, velocity and the like transmitted from nearby vehicles, and determines the possibility of intersection of the host vehicle with any one of the nearby vehicles on the basis of the vehicular information, and, in the case of high possibility of intersection, executes a control for avoiding a collision in some way (e.g., providing information to the driver).

However, the possibility of intersection with another vehicle and, more particularly, the risk of collision with a crossing vehicle are ignored in the aforementioned following run control.

That is, in a case where the likelihood of collision with another vehicle is high if the following vehicle continues to proceed in the same manner, it is dangerous for the following vehicle to proceed as is without taking some sort of precautionary action avoid collision.

SUMMARY OF THE INVENTION

It is a main object of the invention to provide a vehicular driving support apparatus and driving support method that performs a control for avoiding a vehicle collision if, following a preceding vehicle, the possibility of intersection with another vehicle becomes high.

In accordance with a first aspect of the invention, a vehicular driving support apparatus includes an intersecting possibility determining portion that determines a magnitude of possibility of intersection between a host vehicle and another moving object by using communication between moving objects and a following run control portion that sets a first vehicle as a followed vehicle, causes the host vehicle to perform a following run with respect to the first vehicle and, if it is determined that the possibility of intersection is at least a predetermined value, changes a control related to the following run.

In the first aspect of the invention, the other moving object may be a vehicle, and the following run control portion may stop the following run if it is determined that the possibility of intersection has become greater than or equal to the predetermined value.

If a specific vehicle is selected as the followed vehicle in the first aspect of the invention, it is possible to use vehicle-to-vehicle communication and it is also possible to use a radar or the like for measuring the following distance from the host vehicle to a vehicle running ahead of the host vehicle. The two means may also be combined for parallel use.

The first aspect of the invention makes it possible to execute a control for avoiding a vehicle collision if, while following a preceding vehicle the possibility of intersection with another vehicle becomes high. That is, it becomes possible to prevent placement of higher priority on the following run than the collision avoidance.

In the first aspect, the following run control portion may set the first vehicle as the followed vehicle by using vehicle-to-vehicle communication, and may cause the host vehicle to follow the followed vehicle. If the possibility of intersection becomes greater than or equal to the predetermined value, it is preferable that the following run control portion stop the following run while maintaining a setting in which the first vehicle is selected as the followed vehicle. For example, in a case where the followed vehicle is set by using the vehicle-to-vehicle communication, it is preferable that if the possibility of intersection becomes greater than or equal to the predetermined value, the vehicle-to-vehicle communication with the followed vehicle be maintained so that acquisition of vehicular information (regarding position, speed, traveling direction, etc.) from the followed vehicle which is needed for the following run will be continued even after stop of the following run. This will allow immediate resumption of the following run with respect to the followed vehicle when the possibility of intersection reduces below the predetermined value. That is, the aforementioned "stop" of the following run can be performed as "temporary stop". It is possible to adopt a construction in which the resumption of the following run can be avoided automatically or upon a driver's choice. That is, the "stop" of the following run may be performed as "complete abandon".

In the first aspect, it is preferable that the possibility of intersection be determined with respect to a vehicle present on a road that intersects with a road where the host vehicle runs. This is preferable because the conventional following distance control with respect to a preceding vehicle via a radar or the like is not able to detect a vehicle on an intersecting road although it may be able to detect a vehicle that cuts in between the host vehicle and the preceding vehicle.

In the foregoing construction, the driving support apparatus may further include a following distance detector portion that measures a following distance from the host vehicle to the followed vehicle running ahead of the host vehicle, and that supplies information regarding the following distance measured via measurement to the following run control portion.

In the first aspect, the other moving object may be a vehicle, and the following run control portion may change a follow condition related to the following run if it is determined that the possibility of intersection is at least the predetermined value.

In the foregoing construction, the follow condition to be changed may include at least one of a traveling speed of the host vehicle, a traveling speed difference between the host vehicle and the followed vehicle, and the following distance from the host vehicle to the followed vehicle. That is, the follow condition is a control condition related to the target value or range of a predetermined parameter to be maintained for execution of the following run, and the parameter is, for example, the traveling speed difference between the host vehicle and the followed vehicle, the following distance, etc.

This construction makes it possible to change the follow condition (e.g., the following distance) (e.g., to perform the following run with a reduced/increased following distance) so as to reduce the possibility of intersection with another vehicle if the possibility of intersection becomes greater than or equal to the predetermined value. Therefore, it becomes possible to avoid the collision with another vehicle while continuing the following run.

In this construction, it is preferable that the following run of the host vehicle is either temporarily stopped or completely abandoned if it is impossible to change the follow condition.

In the first aspect, the other moving object may be a vehicle, and wherein if it is determined that the possibility of intersection is at least the predetermined value, the following run control portion may transmits information regarding a predetermined control requested by the host vehicle to the followed vehicle by using vehicle-to-vehicle communication.

The control request information is, for example, information that includes a content of requesting execution of a control of increasing the traveling speed.

This construction makes it possible to request the preceding vehicle to control the running state of the preceding vehicle (e.g., the traveling speed thereof) so as to reduce the possibility of intersection between the host vehicle and another vehicle (e.g., to request the preceding vehicle to increase its traveling speed). Therefore, it becomes possible to avoid the collision with another vehicle while continuing the following run without changing the follow condition.

In this construction, it is preferable that the preceding vehicle, receiving the control request information, can reject the request for control in view of the traffic regulations, the possibility of intersection between the preceding vehicle and another vehicle.

If the preceding vehicle does not or cannot execute the predetermined control, it is preferable to perform at least one of an attempt to change the follow condition, the following run is either temporary stopped or complete abandoned.

In accordance with a second aspect of the invention, a driving support method includes a first step of determining a magnitude of possibility of intersection between a host vehicle and another moving object by using communication between moving objects and, a second step of causing the host vehicle to perform a following run with respect to a first vehicle and, if it is determined that the possibility of intersection is at least a predetermined value, changing a control related to the following run.

In the second aspect of the invention, the changing of the control in the second step may include stopping the following run if it is determined that the possibility of intersection is at least the predetermined value.

Furthermore in the second aspect, the changing of the control in the second step may include changing a follow condition related to the following run if it is determined that the possibility of intersection is at least the predetermined value.

Still further in the second aspect, the changing of the control in the second step includes transmitting information regarding a predetermined control requested by the host vehicle to the first vehicle by using vehicle-to-vehicle communication if it is determined that the possibility of intersection is at least the predetermined value.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein.

DETAILED DESCRIPTION OF THE PREFERRED EMBODIMENTS

First to third embodiments of the invention will be described hereinafter with reference to the accompanying drawings. In the first to third embodiments of the invention, attention is focused on the relationship between a collision avoidance system and a following run system where the two systems are simultaneously used. With regard to specific contents of controls in the individual systems, various proposals have been made and knowledge thereof is considered to have been well shared among those skilled in the art, and therefore detailed description thereof will be avoided in this specification.

Firstly, with reference to FIGS. 1, 2A, 2B and 3, a vehicular driving support apparatus and a following run control thereof in accordance with the first embodiment of the invention will be described.

Figure 1:
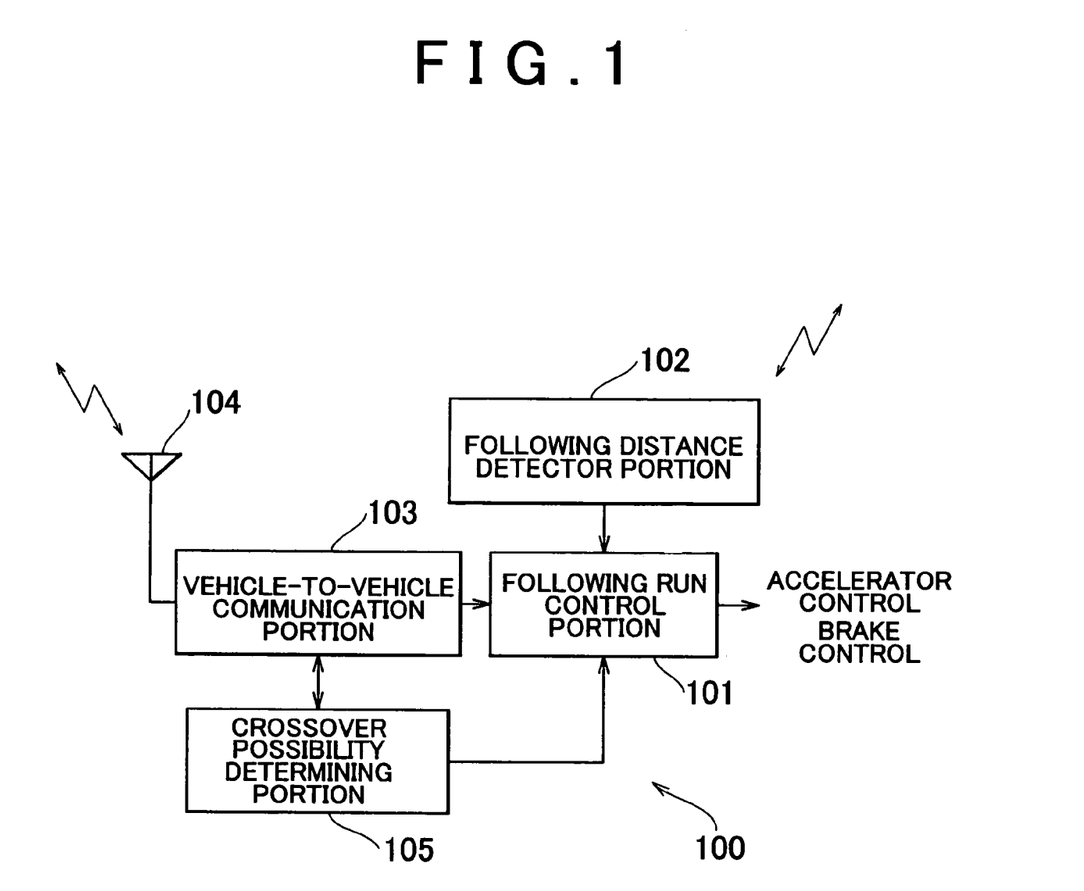
FIG. 1 is a schematic block diagram illustrating the construction of a vehicular driving support apparatus in accordance with a first embodiment of the invention.

FIG. 1 is a schematic block diagram illustrating the construction of a vehicular driving support apparatus 100 in accordance with the embodiment.

The driving support apparatus 100 has a following run control portion 101 for causing a host vehicle to perform a following run with a specific vehicle determined as a follow object. The following run control portion 101 executes an accelerator control, a brake control, etc., on the basis of information acquired from a following distance detector portion 102, a vehicle-to-vehicle communication portion 103, etc., for example, information regarding the traveling speeds of the host vehicle and the followed vehicle and the distance between the two vehicles, and the like. With regard to a specific construction and a specific control method for realizing the following run, detailed description or illustration thereof is omitted in this specification since various proposals have already been published.

The driving support apparatus 100 is provided with the following distance detector portion 102. The following distance detector portion 102 is equipped with a radar device or the like for measuring the following distance of the host vehicle to a vehicle that runs ahead of the host vehicle. The following distance detector portion 102 supplies the following distance information detected thereby to the following run control portion 101.

In this embodiment, the following run may be performed by using only the vehicle-to-vehicle communication. That is, the following distance detector portion 102 is not an essential component element.

The driving support apparatus 100 is further provided with the vehicle-to-vehicle communication portion 103 that utilizes the vehicle-to-vehicle communication. That is, the vehicle-to-vehicle communication portion 103 receives via an antenna 104 vehicular information (e.g., information regarding the present position, the traveling speed, the traveling direction, etc.) that is transmitted (e.g., broadcast) from vehicles present around the host vehicle. It is preferable that the vehicle-to-vehicle communication portion 103 broadcast vehicular information regarding the host vehicle via the antenna 104 so that the information can be used by other vehicles via the vehicle-to-vehicle communication.

The driving support apparatus 100 further has an intersecting possibility determining portion 105 that determines the possibility of intersection between the host vehicle and another vehicle, that is, the risk of vehicle collision, on the basis of the received vehicular information regarding nearby vehicles. For example, if the possibility of intersection with a vehicle reaches or exceeds a predetermined value at the time of pass through an intersection, entrance into a point of merging traffic, etc., the collision avoidance system is activated, so that an information provider portion (not shown) provides information or warning corresponding to the magnitude of possibility of intersection to a driver in at least one of a visual fashion and an audial fashion.

The invention does not concern specific techniques related to what parameters are monitored by the intersecting possibility determining portion 105 or what conditions need to be met in order for the intersecting possibility determining portion 105 to determine that the possibility of intersection is high. In the technical field of the invention, various criteria and algorithms for the determination of the possibility of intersection have been proposed. In the invention, arbitrary criteria and algorithms may be used.

Figure 2A:
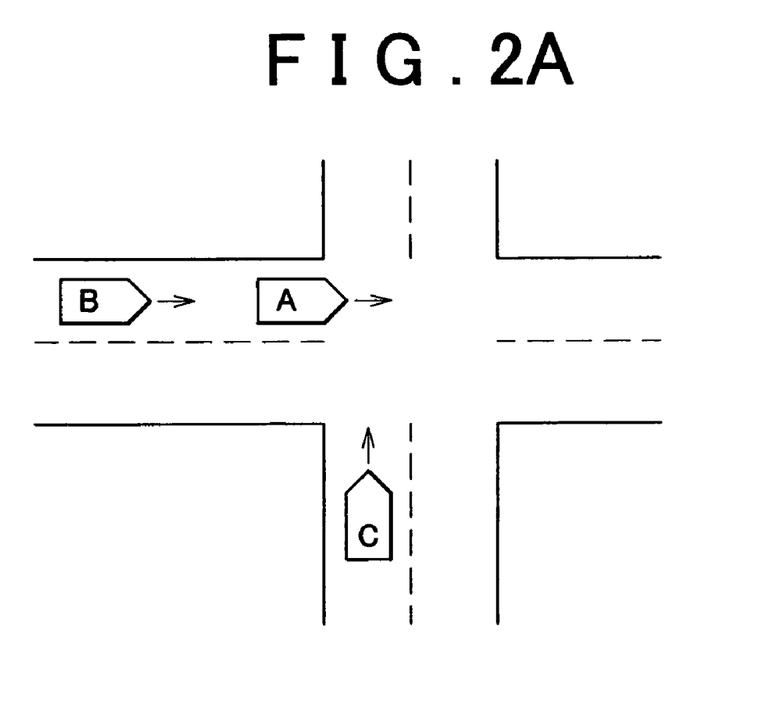
FIG. 2A is a schematic diagram illustrating a traffic situation during execution of the following run.
Figure 3:
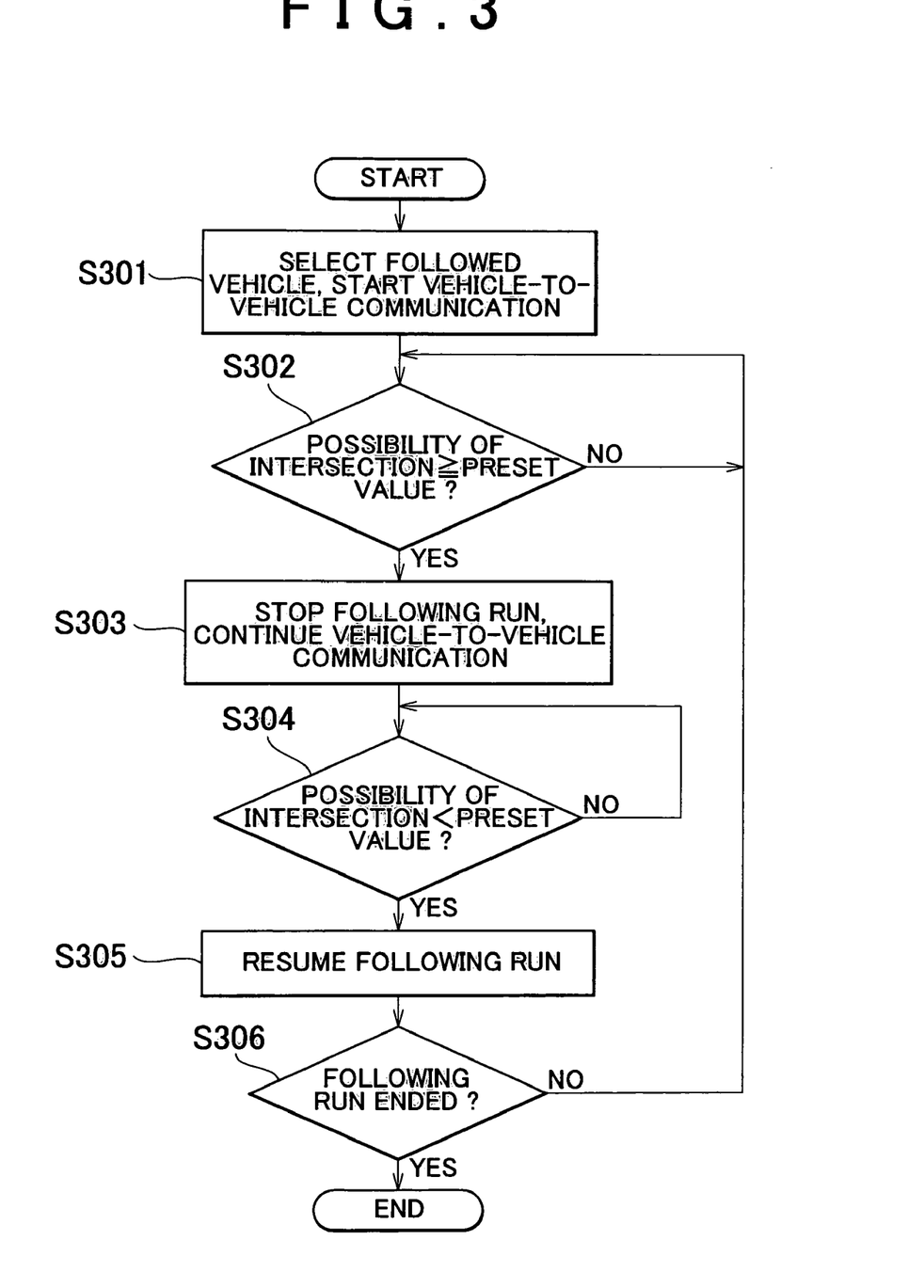
FIG. 3 is a flowchart illustrating the flow of a following run control in accordance with the first embodiment of the invention.

Next, a flow of the following run control executed by the driving support apparatus 100 in accordance with the embodiment will be described with reference to the flowchart shown in FIG. 3. The following description is based on an example situation of traffic schematically illustrated in FIG. 2A.

First, the driving support apparatus 100 on the host vehicle side selects a followed vehicle, and starts the vehicle-to-vehicle communication with the selected vehicle (S301). Apparently, it is possible to use the following distance information detected by the following distance detector portion 102 in addition to the information acquired via the vehicle-to-vehicle communication.

It is assumed herein that a host vehicle B starts a following run with respect to a preceding vehicle A that has been selected as a followed vehicle. It is also assumed that the following run is realized by a target control based on the follow condition, for example, a condition that the speed difference with respect to the preceding vehicle A be kept at a predetermined value or within a predetermined range and/or a condition that the following distance to the preceding vehicle A be kept at a predetermined value or within a predetermined range.

Subsequently, the driving support apparatus 100 monitors whether there exists a vehicle whose possibility of intersection with the host vehicle determined by the intersecting possibility determining portion 105 is greater than or equal to a predetermined value (S302). If there is no vehicle whose intersecting possibility is greater than or equal to the predetermined value ("NO" at S302), the following run control in a normal fashion can be continued.

It is assumed herein that the preceding vehicle A and the host vehicle B are about to enter an intersection which a crossing vehicle C is also about to enter (FIG. 2A), and that it is determined that the possibility of intersection between the crossing vehicle C and the host vehicle B has become greater than or equal to the predetermined value ("YES" at S302) on the basis of the velocity and position of the crossing vehicle C acquired by the intersecting possibility determining portion 105 via the vehicle-to-vehicle communication.

Then, the following run control portion 101 stops the following run (S303). Specifically, the following run control portion 101 avoids execution of the accelerator control or the brake control for fulfilling the aforementioned follow conditions. Therefore, for example, when the collision avoidance system is activated to warn a driver due to an increased possibility of intersection, the driver is allowed to decelerate or stop the host vehicle in order to avoid the collision.

In this case, the vehicle-to-vehicle communication portion 103 continues the vehicle-to-vehicle communication with the preceding vehicle A (S303). Specifically, the following run control portion 101 and the vehicle-to-vehicle communication portion 103 retain the settings based on the preceding vehicle A determined as a followed vehicle even after the following run has been stopped. Then, the reception of vehicular information from the followed vehicle continues.

That is, when the host vehicle B temporarily suspends the following run with respect to the preceding vehicle A due to the appearance of the crossing vehicle C, the host vehicle B does not completely abandon the following run control, but stands by for resumption of the control.

Subsequently, the vehicle-to-vehicle communication portion 103 waits until the possibility of intersection drops below a predetermined value (S304). For example, if, in response to the warning, the driver of the host vehicle B stops the vehicle before the intersection as indicated in FIG. 2B, the passing of the crossing vehicle C through the intersection makes a substantially zero possibility of intersection between the host vehicle B and the crossing vehicle C (i.e., substantially eliminates the possibility), so that the condition is met in S304.

Figure 2B:
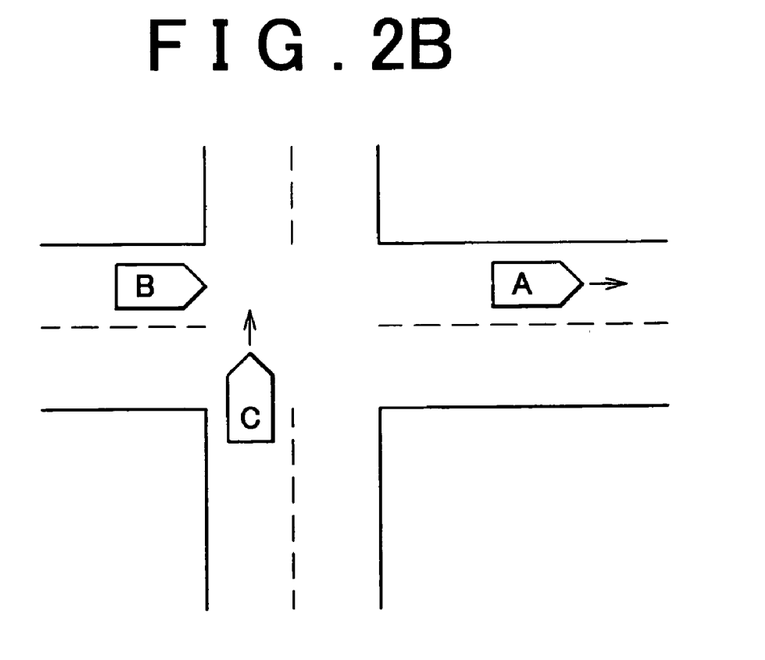
FIG. 2B is a schematic diagram illustrating a situation where a vehicle collision has been avoided by a control in accordance with the first embodiment of the invention.

In the situation illustrated in FIG. 2B, the preceding vehicle A continues running, so that the distance between the vehicles A and B has increased from the vehicle-to-vehicle distance maintained during the following run illustrated in FIG. 2A. Since the following run has already been stopped in the situation of FIG. 2B, the following run system naturally accepts increases in the distance between the vehicles A and B to such an extent that the aforementioned follow condition is not met.

If the possibility of intersection becomes sufficiently low ("YES" at S304), the host vehicle B resumes the following run with respect to the preceding vehicle A (S305) on the basis of the vehicular information regarding the preceding vehicle A, which the host vehicle B has continued receiving from the preceding vehicle A via the vehicle-to-vehicle communication.

More specifically, the host vehicle B executes the following run along the route of travel of the preceding vehicle A while maintaining the traveling speed that satisfies the follow condition. If the follow condition includes the following distance being within a predetermined range, it is also possible to execute the accelerator control so as to achieve the following distance within the predetermined range while maintaining a predetermined range of vehicle speed.

After the following run is resumed in this manner, the following run control in a normal fashion is continued ("NO" at S306) as long as there is not any particular event, for example, an event that the following run is ended by a driver's choice ("YES" at S306).

According to the embodiment, if, while following a specific vehicle, there appears a vehicle having a high possibility of intersection with the host vehicle, the following run can be stopped to allow a collision avoiding action to be taken. Furthermore, in that case, the reception of vehicular information from the followed vehicle via the vehicle-to-vehicle communication is continued, so that the host vehicle can resume the following run with respect to the followed vehicle at any time.

Figure 2C:
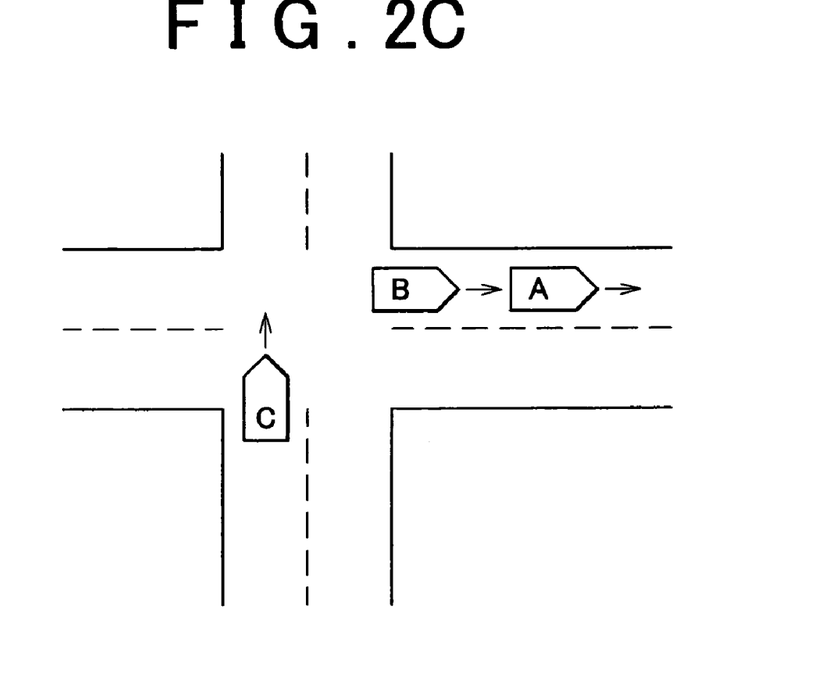
FIG. 2C is a schematic diagram illustrating a situation where a vehicle collision has been avoided by a control in accordance with a second embodiment of the invention.

A vehicular driving support apparatus and a following run control thereof in accordance with a second embodiment of the invention will be described with reference to FIGS. 2A, 2C and 4.

The construction of the driving support apparatus of this embodiment is substantially the same as that of the driving support apparatus 100 of the first embodiment shown in FIG. 1, and therefore will not be described again. In the following description of this embodiment, the traffic situation illustrated in FIG. 2A is assumed.

Figure 4:
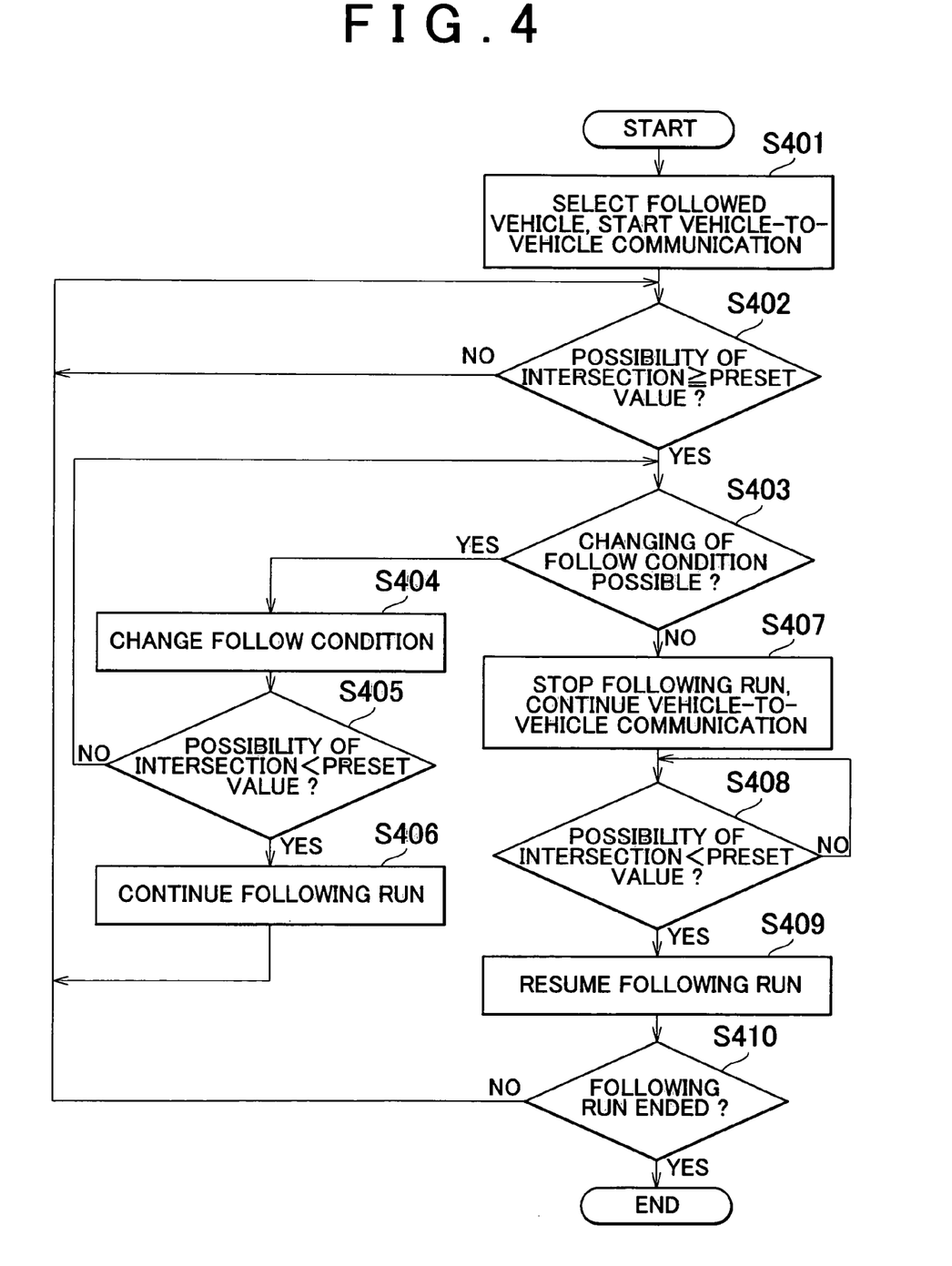
FIG. 4 is a flowchart illustrating the flow of a following run control in accordance with the second embodiment of the invention.

FIG. 4 is a flowchart illustrating the flow of a following run control process in accordance with this embodiment. The processes of S401 and S402 are the same as the processes of S301 and S302 shown in FIG. 3, and will not be described below.

If it is determined that the possibility of intersection between the host vehicle B and the crossing vehicle C has become higher than or equal to a predetermined value ("YES" at S402 in FIG. 2A), it is subsequently determined whether the follow condition applied to the following run of the host vehicle B with respect to the preceding vehicle A can be changed (S403).

It is to be noted herein that the follow condition is a control condition related to the target value or range of a predetermined parameter to be maintained for execution of the following run, and that the parameter is, for example, the speed of the host vehicle, the traveling speed difference between the host vehicle and the followed vehicle, the following distance, etc.

It is assumed herein that upper and lower limit values of these parameters are predetermined. The apparatus of the host vehicle B determines whether the follow condition of the host vehicle can be changed with reference to the upper and lower limit values of the parameters and the traffic situation.

If it is determined that the follow condition can be changed ("YES" at S403), the apparatus of the host vehicle B changes the follow condition in such a direction as to reduce the possibility of intersection with the crossing vehicle C (S404). As examples of the change, increasing/decreasing the traveling speed and/or decreasing/increasing the following distance are conceivable.

If the possibility of intersection becomes less than the predetermined value ("YES" at S405) after the follow condition has been changed, the following run is continued (S406). FIG. 2C schematically shows a situation where the possibility of intersection is reduced to substantially zero (substantially eliminated) by changing the follow condition, more specifically, reducing the following distance, so that the following run has continued without a break.

The changed follow condition may be set back to the original condition at appropriate timing, for example, after the elapse of a predetermined time following the change, or after the elapse of a predetermined time after the possibility of intersection has become substantially zero (see above).

If the changing of the follow condition does not reduce the possibility of intersection below the predetermined value ("NO" at S405), the process returns to S403. Thus, the process of S403 to S405 is repeated as long as a further change of the follow condition is possible. If despite the changing of the follow condition to a limit, the possibility of intersection does not drop below the predetermined value ("NO" at S403), the process substantially identical to the process of S303 to S306 in FIG. 3 in the first embodiment is executed in S407 to S410, so that the following run is temporarily stopped for collision avoidance.

According to this embodiment, if, during the following run of the host vehicle with respect to a specific vehicle, a vehicle with high possibility of intersection with the host vehicle appears, the follow condition can be changed so as to avoid the collision with the vehicle and continue the following run without a break. If the changing of the follow condition does not allow avoidance of the collision, the follow condition can be temporarily stopped in such a manner that the following run can be resumed.

Figure 2D:
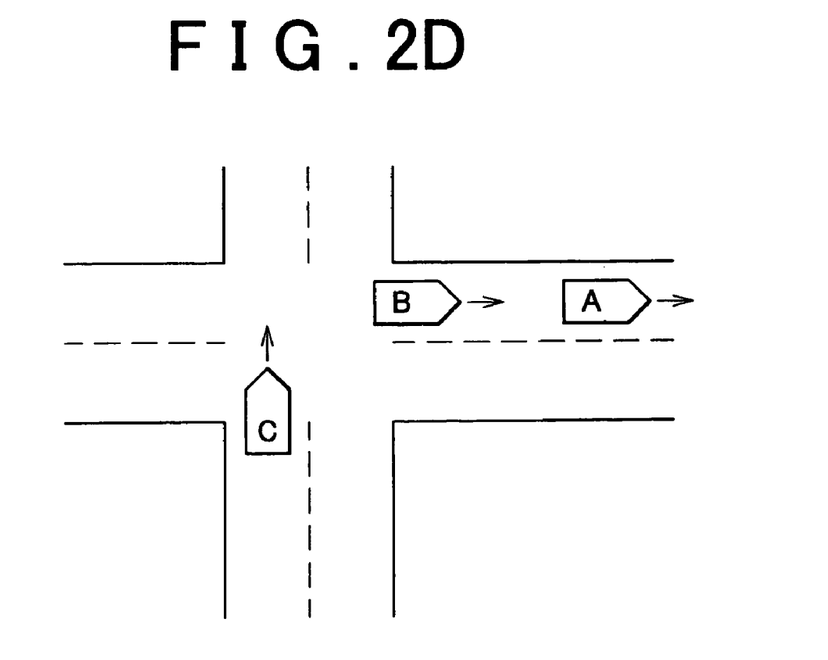
FIG. 2D is a schematic diagram illustrating a situation where a vehicle collision has been avoided by a control in accordance with a third embodiment of the invention.

Next, a vehicular driving support apparatus and a following run control thereof in accordance with a third embodiment of the invention will be described with reference to FIGS. 2A, 2D and 5.

The construction of the driving support apparatus of this embodiment is substantially the same as that of the driving support apparatus 100 of the first embodiment shown in FIG. 1, and will not be described below. In the description below, the traffic situation illustrated in FIG. 2A is assumed.

Figure 5:
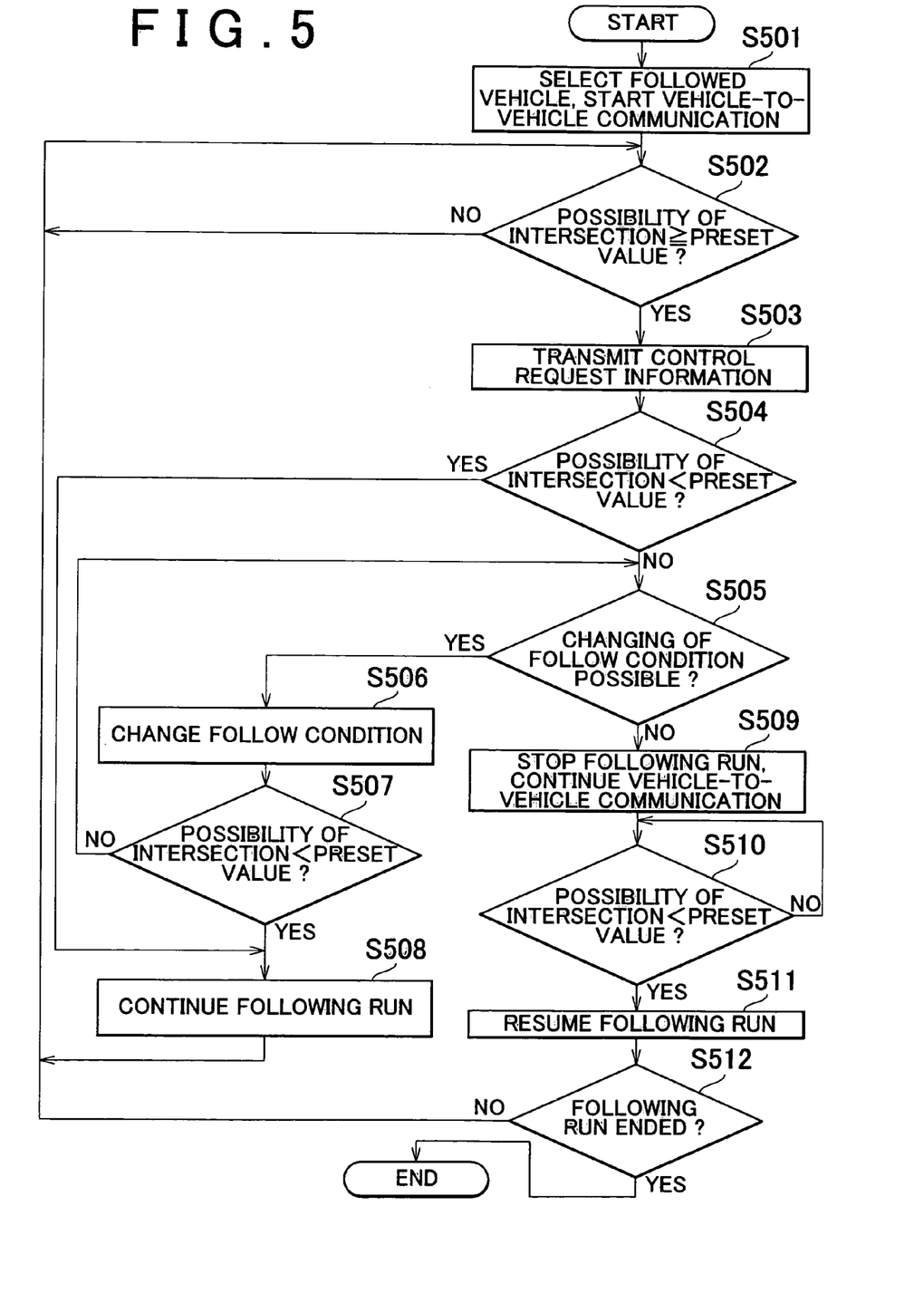
FIG. 5 is a flowchart illustrating the flow of a following run control in accordance with the third embodiment of the invention.

FIG. 5 is a flowchart illustrating the flow of a following run control process in accordance with this embodiment. The process of S501 and S502 is substantially the same as the process of S301 and S302 shown in FIG. 3, and will not be described below.

If it is determined that the possibility of intersection between the host vehicle B and the crossing vehicle C has become greater than or equal to a predetermined value ("YES" at S502 in FIG. 2A), the host vehicle B transmits control request information to a preceding vehicle A via the vehicle-to-vehicle communication (S503).

The control request information is information that includes a control content of requesting the preceding vehicle A to execute a certain control related to the running state, such as a control of increasing the traveling speed or the like.

For example, if during a following run, the preceding vehicle A, that is, the followed vehicle of the host vehicle B, increases its traveling speed in response to the request, the host vehicle B also increases its traveling speed due to a following run control function of keeping the vehicle speed difference and/or the following distance within a predetermined range. Therefore, the host vehicle B sends the preceding vehicle A such a control request that the possibility of intersection between the host vehicle B and the crossing vehicle C will become less than the predetermined value.

If the possibility of intersection becomes less than a predetermined value ("YES" at S504) after the control request has been sent, the following run is continued (S508). FIG. 2D schematically shows a situation where the preceding vehicle A has responded to the request for the preceding vehicle A to increase the traveling speed and therefore the possibility of intersection is substantially zero (see the description above). Therefore, FIG. 2D, the follow condition has not been changed and the following run has continued without a break.

It is to be noted that the preceding vehicle A, after receiving the control request information, does not need to meet the request. It is appropriate for the preceding vehicle A to meet the request only when execution of the requested control will not give rise to any problem, considering the possibility of intersection between the preceding vehicle A and a vehicle near the preceding vehicle A.

If after the control request is sent, the possibility of intersection does not become less than the predetermined value ("NO" at S504), the process substantially identical to the process of S403 to S410 of the second embodiment shown in FIG. 4 is executed in S505 to S512. First, collision avoidance is attempted by changing the follow condition. After that, the following run is temporarily stopped if necessary.

According to this embodiment, if, while following a specific vehicle, a vehicle with high possibility of intersection with the host vehicle appears, the host vehicle can request the preceding vehicle to control the running state of the preceding vehicle so as to reduce the possibility of intersection between the host vehicle and the vehicle having high possibility of intersection. Therefore, the host vehicle can avoid the collision with another vehicle while continuing the following run without changing the follow condition. If the request to the preceding vehicle for the control does not reduce the possibility of intersection between the host vehicle and the other vehicle, the host vehicle changes the follow condition so as to avoid the collision with the other vehicle and continue the following run without a break. Furthermore, if the changing of the follow condition does not allow avoidance of the collision, the following run can be temporarily stopped in such a manner that the following run can be resumed.

In any one of the first to third embodiments of the invention described above, the resumption of the following run (S305, S409 and S511) is not an essential element of the invention. That is, it is possible to adopt a control content in which when the following run is stopped (S303, S407 and S509), the setting for the following run with respect to the preceding vehicle being determined as a present followed vehicle is cleared to completely abandon the following run control with respect to the preceding vehicle if the driver of the host vehicle desires so.

In the first to third embodiments, a crossing vehicle is presented as an example of the object moving object whose possibility of intersection with the host vehicle is monitored. However, the application of the invention is not restricted by this example. That is, according to the invention, it is possible to determine the possibility of intersection of the host vehicle with an oncoming vehicle (particularly, on a blind curve or the like) or the possibility of intersection with other moving objects such as a pedestrian or a bicycle (rider) having a transmitter that transmits moving object information that includes the position and speed information similar to the aforementioned vehicular information.

As is apparent from the foregoing description, the embodiments of the invention provide vehicular driving support apparatuses that execute a control for avoiding a collision of the host vehicle if, while following a preceding vehicle, the possibility of intersection with another vehicle becomes high.

What is claimed is:

1. A vehicular driving support apparatus comprising:
a following run control portion that performs a control related to a following run by which a host vehicle follows a first vehicle; and
an intersecting possibility determining portion that determines a possibility of intersection between the host vehicle and another moving object by using communication between the host vehicle and the another moving object;
wherein the following run control portion changes the control related to the following run, if the intersecting possibility determining portion determines that the possibility of intersection is greater than or equal to a predetermined value.

2. The vehicular driving support apparatus according to claim 1, wherein the other moving object is a vehicle, and wherein the following run control portion stops the following run if it is determined that the possibility of intersection has become greater than or equal to the predetermined value.

3. The vehicular driving support apparatus according to claim 2, wherein the possibility of intersection is determined with respect to a vehicle present on a road that intersects with a road on which the host vehicle runs.

4. The vehicular driving support apparatus according to claim 2, wherein the following run control portion sets the first vehicle as the followed vehicle by using vehicle-to-vehicle communication, and causes the host vehicle to follow the followed vehicle.

5. The vehicular driving support apparatus according to claim 2, wherein if the possibility of intersection becomes greater than or equal to the predetermined value, the following run control portion performs either a temporary stop or a complete abandonment with respect to the following run while maintaining a setting in which the first vehicle is selected as the followed vehicle.

6. The vehicular driving support apparatus according to claim 2, wherein if the possibility of intersection becomes greater than or equal to the predetermined value, the following run control portion performs either a temporary stop or a complete abandonment with respect to the following run while maintaining the vehicle-to-vehicle communication between the host vehicle and the followed vehicle.

7. The vehicular driving support apparatus according to claim 2, further comprising a following distance detector portion that measures a following distance from the host vehicle to the followed vehicle running ahead of the host vehicle, and that supplies information regarding the following distance measured via measurement to the following run control portion.

8. The vehicular driving support apparatus according to claim 1, wherein the other moving object is a vehicle, and wherein if it is determined that the possibility of intersection is at least the predetermined value, the following run control portion changes a follow condition related to the following run.

9. The vehicular driving support apparatus according to claim 8, wherein the follow condition to be changed includes at least one of a traveling speed of the host vehicle, a traveling speed difference between the host vehicle and the followed vehicle, and the following distance from the host vehicle to the followed vehicle.

10. The vehicular driving support apparatus according to claim 8, wherein the following run of the host vehicle is either temporarily stopped or completely abandoned if it is impossible to change the follow condition.

11. The vehicular driving support apparatus according to claim 1, wherein the other moving object is a vehicle, and wherein if it is determined that the possibility of intersection is at least the predetermined value, the following run control portion transmits information regarding a predetermined control requested by the host vehicle to the followed vehicle by using vehicle-to-vehicle communication.

12. The vehicular driving support apparatus according to claim 11, wherein the follow condition is changed if the followed vehicle does not or cannot execute the predetermined control.

13. The vehicular driving support apparatus according to claim 11, wherein the following run is either temporarily stopped or completely abandoned if the followed vehicle does not or cannot execute the predetermined control.

14. A driving support method comprising:
a first step of determining a magnitude of possibility of intersection between a host vehicle and another moving object by using communication between moving objects; and
a second step of causing the host vehicle to perform a following run with respect to a first vehicle and, if it is determined that the possibility of intersection is at least a predetermined value, changing a control related to the following run.

15. The driving support method according to claim 14, wherein the changing of the control in the second step includes stopping the following run if it is determined that the possibility of intersection is at least the predetermined value.

16. The driving support method according to claim 14, wherein the changing of the control in the second step includes changing a follow condition related to the following run if it is determined that the possibility of intersection is at least the predetermined value.

17. The driving support method according to claim 14, wherein the changing of the control in the second step includes transmitting information regarding a predetermined control requested by the host vehicle to the first vehicle by using vehicle-to-vehicle communication if it is determined that the possibility of intersection is at least the predetermined value.

* * * * *